(12) United States Patent
Bae

(10) Patent No.: US 7,967,488 B2
(45) Date of Patent: Jun. 28, 2011

(54) BREAKABLE STRUCTURE OF HEADLAMP FOR VEHICLES

(75) Inventor: Seung Hyun Bae, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 61 days.

(21) Appl. No.: 12/479,471

(22) Filed: Jun. 5, 2009

(65) Prior Publication Data

US 2010/0014306 A1 Jan. 21, 2010

(30) Foreign Application Priority Data

Jul. 21, 2008 (KR) .................. 10-2008-0070571

(51) Int. Cl.
*F21V 7/04* (2006.01)
(52) U.S. Cl. .......................... 362/549; 362/546; 362/390
(58) Field of Classification Search .................. 362/390, 362/549, 546
See application file for complete search history.

(56) References Cited

U.S. PATENT DOCUMENTS

| 4,475,148 | A | * | 10/1984 | Tomforde | 362/549 |
| 4,658,335 | A | * | 4/1987 | Culler | 362/549 |
| 6,135,619 | A | * | 10/2000 | Donaire Camacho et al. | 362/288 |
| 6,190,030 | B1 | * | 2/2001 | Chase | 362/549 |
| 6,471,386 | B2 | * | 10/2002 | Oh | 362/549 |
| 7,303,040 | B2 | * | 12/2007 | Green et al. | 180/274 |
| 7,390,114 | B2 | * | 6/2008 | Konig et al. | 362/523 |
| 7,419,291 | B2 | * | 9/2008 | Arlon | 362/549 |
| 7,517,121 | B2 | * | 4/2009 | Arlon et al. | 362/507 |

FOREIGN PATENT DOCUMENTS

| KR | 2003-0041394 A | 5/2003 |
| KR | 10-0726728 B1 | 6/2007 |

* cited by examiner

*Primary Examiner* — Anabel M Ton
(74) *Attorney, Agent, or Firm* — Morgan, Lewis & Bockius LLP

(57) ABSTRACT

A breakable structure of a headlamp for vehicles is partially broken and deformed when an impact force is applied to the headlamp. The breakable structure of the present invention includes at least a separable member provided in the junction of the headlamp housing and the headlamp lens, the separable member being separated from the junction of the headlamp and the headlamp lens when an impact force is applied thereto.

8 Claims, 4 Drawing Sheets

BREAKABLE STRUCTURE OF HEADLAMP FOR VEHICLES

CROSS-REFERENCE TO RELATED APPLICATION

The present application claims priority to Korean Patent Application Number 10-2008-0070571, filed on Jul. 21, 2008, the entire contents of which is incorporated herein for all purposes by this reference.

BACKGROUND OF THE INVENTION

1. Field of the Invention

The present invention relates to a breakable structure of a headlamp for vehicles which is partially broken and deformed when an impact force is applied to the headlamp.

2. Description of Related Art

Generally, a lighting system for a vehicle includes headlamps for emitting light to the front of the vehicle, turn signal lamps for indicating the intention to turn the vehicle, an interior lamp for illuminating the passenger compartment, and back up lamps for indicating the backward movement of the vehicle.

The headlamps are provided between a bumper and an engine hood on both sides. The headlamps illuminate the front of vehicle to provide forward visibility to the driver mainly at night, such that the driver can easily discern the condition of a road surface or the positions of obstacles.

As shown in FIG. 4, each headlamp includes a bulb 10 which emits light to the front of the vehicle, and a reflector 20 which surrounds the bulb 10 and reflects light emitted from the bulb 10. The headlamp further includes a lamp housing 30 which contains the bulb 10 and the reflector 20 therein, and a dust cap 40 which is coupled to the rear end of the lamp housing 30 to prevent foreign substances from being drawn into the lamp housing 30 from the engine room. Furthermore, a mounting rib 50 is integrally provided on the lamp housing 30. The mounting rib 50 is coupled to a vehicle body 60 using a nut and a bolt.

In the conventional headlamp having the above-mentioned construction, because high thermal energy is generated from the bulb, the components of the headlamp typically have strength and hardness sufficient to resist heat and impact. However, as such, the headlamp having high strength and hardness may severely injure a pedestrian when the vehicle collides with the pedestrian. Furthermore, these characteristics of the conventional headlamp do not meet the pedestrian protection regulations.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a breakable structure of a headlamp for vehicles which disperses impact energy generated by a collision in such a way as to partially break and deform the headlamp.

In an aspect of the present invention, the breakable structure of a headlamp for a vehicle to break a junction coupling a headlamp housing and a headlamp lens, may include at least a separable member provided in the junction of the headlamp housing and the headlamp lens, the separable member being separated from the junction of the headlamp and the headlamp lens when an impact force is applied thereto, wherein the separable member is configured to break by a rotation moment of the impact force applied thereto.

The separable member may include a lens side notch formed in the headlamp lens, and a housing side notch formed in the headlamp housing, wherein the lens side notch and the housing side notch are combined to form a closed loop surrounding the separable member.

The lens side notch and the housing side notch may not be disposed on the same level so that the rotation moment of the impact force can be applied thereto to separate the separable member from the junction, wherein the lens side notch is disposed higher than the housing side notch, wherein a portion of the separable member including the lens side notch is inclined downwards and the lens side notch is formed by milling and, wherein a portion of the separable member including the lens side notch is bent downwards at the lens side notch with a predetermined angle, and the lens side notch is formed through a molding process.

The junction may include a fastening unit provided between the separable members for fastening the headlamp lens and the headlamp housing to each other, wherein the fastening unit may include an insert protrusion provided on an edge of the headlamp lens and an insert depression formed in a corresponding edge of the headlamp housing such that the insert protrusion is fitted into the insert depression.

The junction may include a plurality of fastening units provided between the separable members for fastening the headlamp lens and the headlamp housing to each other, wherein the separable member is disposed between the adjacent fastening units alternatively, and wherein the fastening unit may include an insert protrusion provided on an edge of the headlamp lens and an insert depression formed in a corresponding edge of the headlamp housing such that the insert protrusion is fitted into the insert depression.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
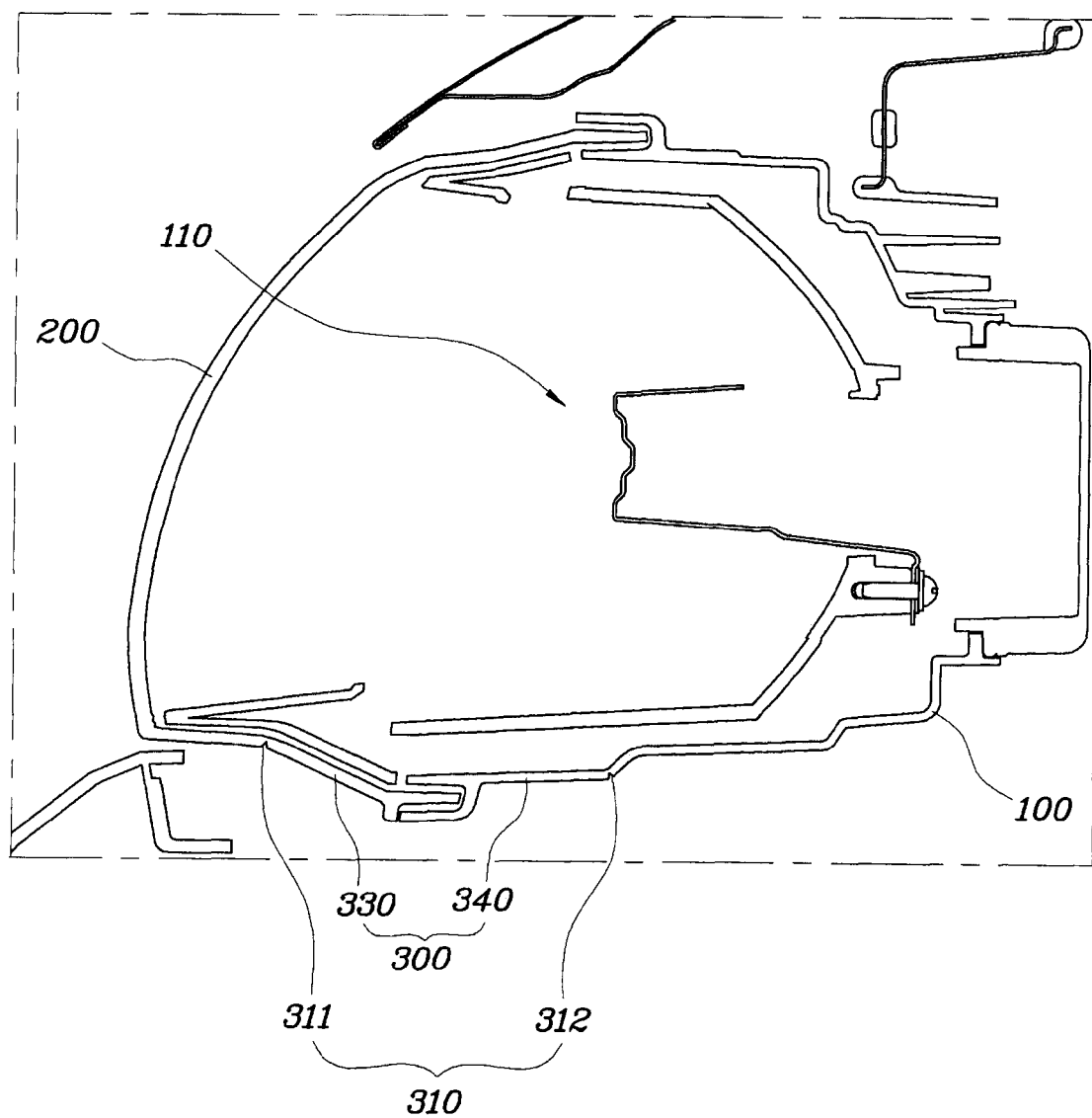
FIG. 1 is a view showing an exemplary breakable structure of a headlamp for vehicles, according to the present invention.
Figure 2:
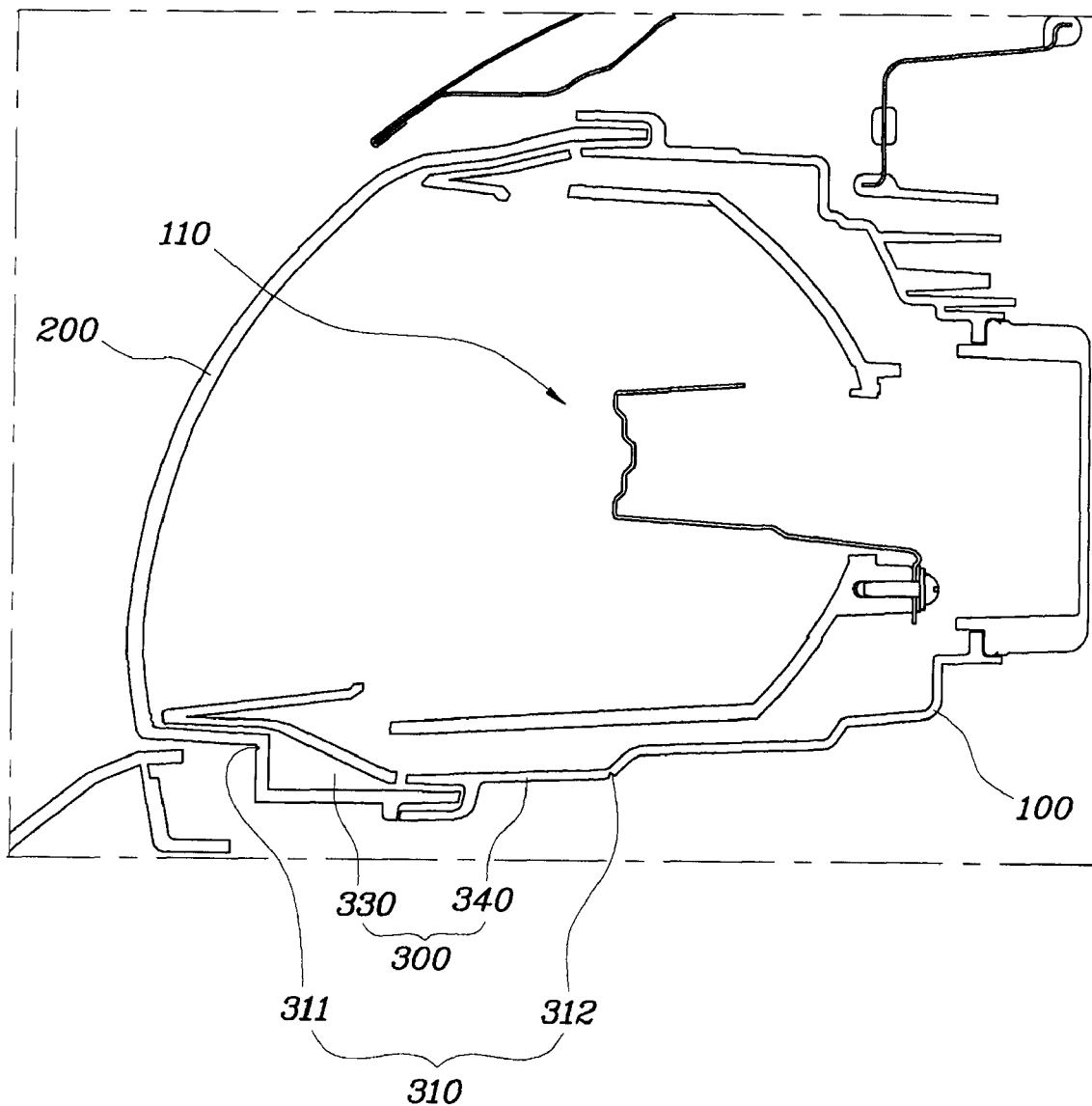
FIG. 2 is a view showing an exemplary breakable structure of a headlamp for vehicles, according to a modification of the embodiment of FIG. 1.

As shown in FIGS. 1 and 2, a breakable structure of a headlamp according to various embodiments of the present invention is characterized in that a separable member 300 is provided in a junction 220 between a headlamp housing 100 and a headlamp lens 200 and a breakable notch 310 is formed therebetween such that when an impact force is applied to the headlamp, the separable member 300 is separated from the headlamp housing 100 and the headlamp lens 200, thus dispersing and absorbing the impact energy.

The construction of the present invention for achieving the above purpose will be described in detail below. A bulb unit 100 including a bulb and a reflector is installed in the headlamp housing 100. A headlamp lens 200 is coupled to the front end of the headlamp to cover the bulb unit 110. Here, the bulb functions to emit light to the front of the vehicle, and the reflector functions to reflect light emitted from the bulb.

The separable member 300 is provided in the junction 220 between the headlamp housing 100 and the headlamp lens 200 and is separated therefrom along the breakable notch 310 when an impact force is applied to the headlamp. The breakable notch 310 comprises a lens side notch 311 which is formed in the headlamp lens 200, and a housing side notch 312 which is formed in the headlamp housing 100. It is preferable that the breakable notch 310 have a rectangular closed loop shape which surrounds the separable member 300. The separable member 300 is defined in a rectangular shape by the breakable notch 310. Therefore, when an impact force is applied to the headlamp, the rectangular separable member 300 is separated from the headlamp, thus dispersing the impact energy.

In various embodiments, although the breakable notch 310 has been illustrated as having the rectangular closed loop shape which surrounds the separable member 300, the shape of the breakable notch 310 is not limited to the above shape. In other words, the breakable notch 310 may have any shape, as long as the separable member 300 can be easily separated from the headlamp by the impact force and thus disperse the impact energy. For example, as well as having the rectangular closed loop shape, the breakable notch 310 may have a circular or polygonal closed loop shape or other various shapes.

In various embodiments of the present invention, the lens side notch 311 and the housing side notch 312 may not be on the same level so that a rotation moment of the impact force can be applied on the separation member 200. For example, the lens side notch 311 may be disposed higher than the housing side notch 312.

The separable member 300 includes a lens side separable member 330 and a housing side separable member 340. The lens side separable member 330 is coupled to the headlamp housing 100 and is formed on a corresponding edge of the headlamp lens 200 along the lens side notch 311. The housing side separable member 340 is coupled to the headlamp lens 200 and is provided on a corresponding edge of the headlamp housing 100 along the housing side notch 312.

The shape of the separable member 300 may be modified depending on a method of forming the lens side notch 311. In detail, as shown in FIG. 1, in the case where the lens side notch 311 is formed in the headlamp lens 200 by milling, in consideration of the conditions of the milling process, the lens side separable member 300 is preferably inclined downwards such that the breakable notch 310 is formed in the thickness direction of the headlamp lens 200. On the other hand, as shown in FIG. 2, in the case where the lens side notch 311 is formed in the headlamp lens 200 through a molding process, because the conditions of the molding process have little effect on the shape of the lens side separable member 330, the lens side separable member 330 can be formed into a bent shape.

In other words, the lens side separable member 330 may be formed such that it is inclined downwards from the lens side notch 311. In this case, the lens side notch 311 is formed by milling. Alternatively, the lens side separable member 330 may be formed into a bent shape based on the lens side notch 311. In this case, the lens side notch 311 is formed through a milling or molding process.

Figure 3:
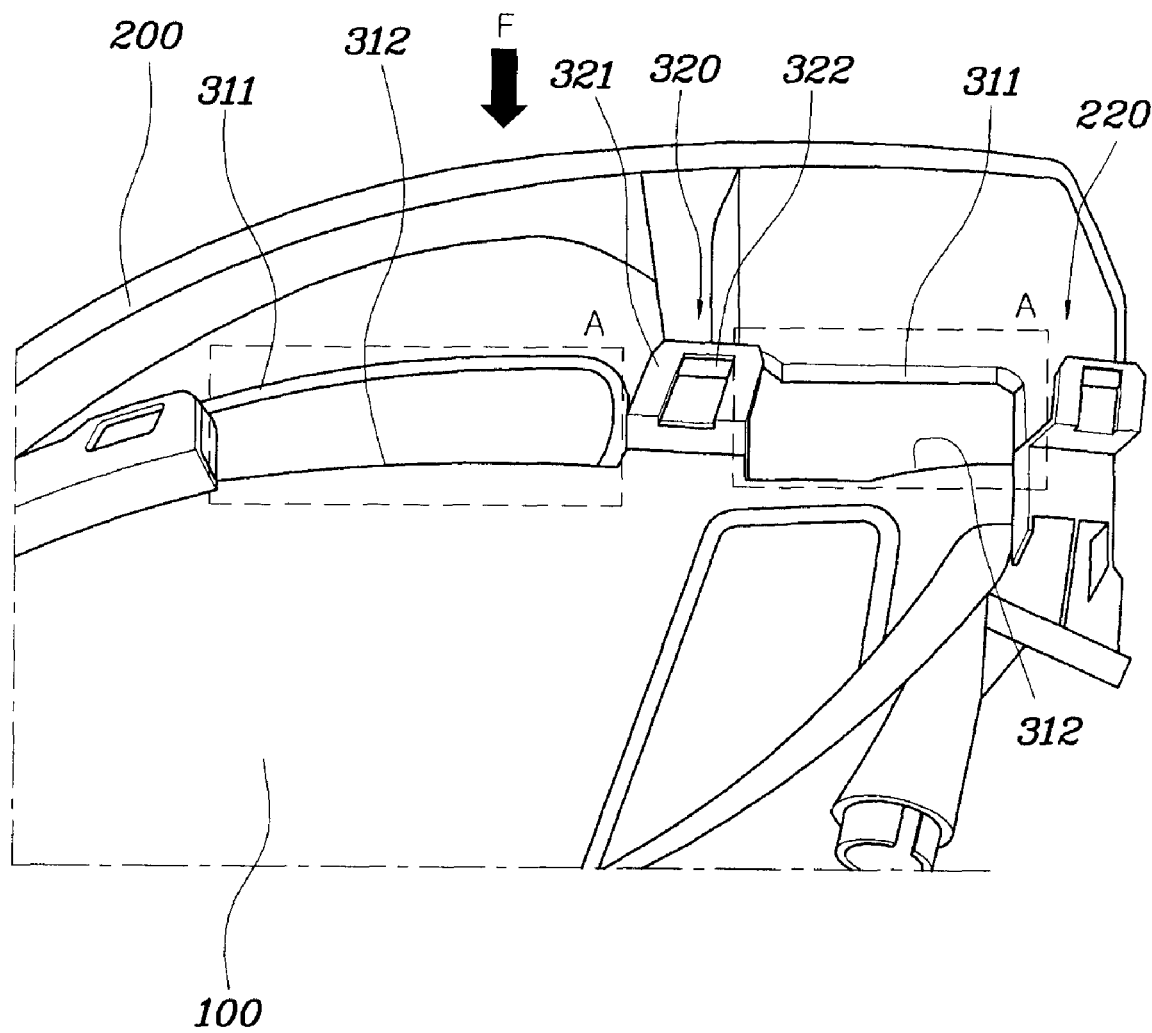
FIG. 3 is a view showing a state of an exemplary breakable structure of the headlamp after an impact force has been applied thereto according to the present invention.
Figure 4:
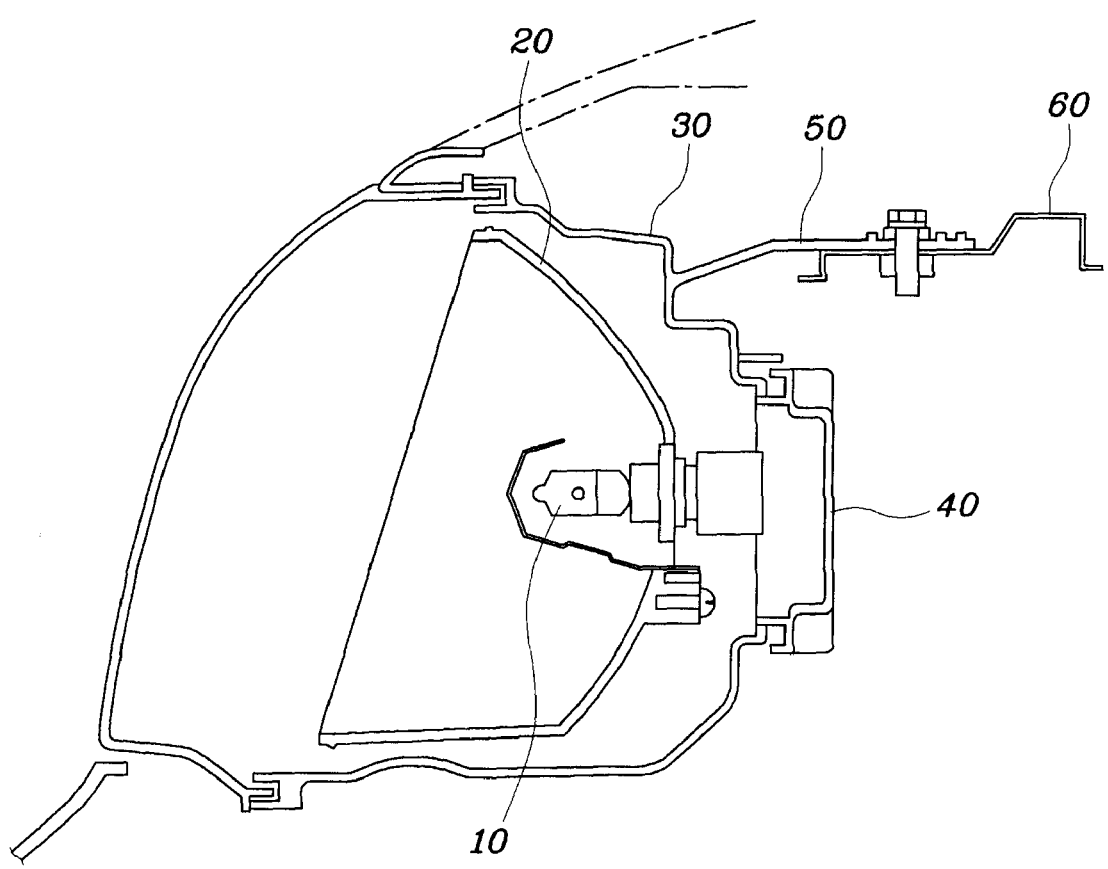
FIG. 4 is a view showing the structure of a headlamp for vehicles according to a conventional technique.

Meanwhile, as shown in FIG. 3, a fastening unit 320 having a force-fitting structure is provided on the junction between the headlamp lens 200 and the headlamp housing 100 to fasten the headlamp lens 200 and the headlamp housing 100 to each other. The fastening unit 320 may include an insert protrusion 321 which is provided on the edge of the headlamp lens 200, and an insert depression 322 which is formed in the edge of the headlamp housing 100 such that the insert protrusion 321 is fitted into the insert depression 322. The headlamp lens 200 and the headlamp housing 100 are fastened to each other using the coupling between the insert protrusion 321 and the insert depression 322.

The fastening unit 320 may comprise a plurality of fastening units 320 which are provided on the junction between the headlamp housing 100 and the headlamp lens 200 at positions spaced apart from each other at regular intervals. In this case, the separable member 300 which can be separated from the headlamp by an impact force is disposed between the adjacent fastening units 320.

Meanwhile, when impact energy generated by an impact, for example, a vehicle collision, is applied to the headlamp, the lens side notches 311 of the headlamp lens 200 and the housing side notches 312 of the headlamp housing 100 are broken by the impact force, so that the separable members 300 which are designated by the portions "A" of FIG. 3 are separated from the headlamp.

Here, because the breakable notch 310 has a rectangular closed loop shape, the separable member 300 is separated from the headlamp into a rectangular shape, and the remaining part of the headlamp other than the separable member 300 is deformed to disperse the impact energy. In other words, when the impact force is applied to the headlamp, the separable member 300 is detached from the headlamp by the breakable notch 310 being broken by the impact force, and the remaining part of the headlamp is continuously deformed. As a result, the impact energy is prevented from being focused on a special part and, in other words, it can be evenly dispersed. Therefore, the present invention can meet the pedestrian protection regulations.

As described above, in a breakable structure of a headlamp for vehicles according to the present invention, the headlamp is partially broken and deformed when an impact force is applied thereto, so that the impact energy can be evenly dispersed. Thereby, the present invention meets the pedestrian protection regulations.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A breakable structure of a headlamp for a vehicle configured to break a junction coupling a headlamp housing and a headlamp lens, the breakable structure comprising:
    a separable member provided in the junction of the headlamp housing and the headlamp lens, the separable member being separated from the junction of the headlamp and the headlamp lens when an impact force is applied thereto;
    wherein the separable member is configured to break by a rotational moment of the impact force applied thereto;
    wherein the separable member includes:
        a lens side notch formed in the headlamp lens; and
        a housing side notch formed in the headlamp housing;
    wherein the lens side notch and the housing side notch are combined to form a closed loop surrounding the separable member;
    wherein the lens side notch and the housing side notch are not disposed on the same level so that the rotation moment of the impact force can be applied thereto to separate the separable member from the junction; and
    wherein the lens side notch is disposed higher than the housing side notch.

2. The breakable structure as set forth in claim 1, wherein a portion of the separable member including the lens side notch is inclined downwards and the lens side notch is formed by milling.

3. The breakable structure as set forth in claim 1, wherein a portion of the separable member including the lens side notch is bent downwards at the lens side notch with a predetermined angle, and the lens side notch is formed through a molding process.

4. The breakable structure as set forth in claim 1, wherein the junction includes a fastening unit provided between the separable members for fastening the headlamp lens and the headlamp housing to each other.

5. The breakable structure as set forth in claim 4, wherein the fastening unit comprises:
    an insert protrusion provided on an edge of the headlamp lens; and
    an insert depression formed in a corresponding edge of the headlamp housing such that the insert protrusion is fitted into the insert depression.

6. The breakable structure as set forth in claim 1, wherein the junction includes a plurality of fastening units provided between the separable members for fastening the headlamp lens and the headlamp housing to each other, wherein the separable member is disposed between the adjacent fastening units alternatively.

7. The breakable structure as set forth in claim 6, wherein the fastening unit comprises:
    an insert protrusion provided on an edge of the headlamp lens; and
    an insert depression formed in a corresponding edge of the headlamp housing such that the insert protrusion is fitted into the insert depression.

8. A passenger vehicle comprising the breakable structure as set forth in claim 1.

* * * * *